United States Patent
Tirry et al.

(10) Patent No.: US 7,433,417 B2
(45) Date of Patent: Oct. 7, 2008

(54) RECEIVER WITH A SIGNAL PATH

(75) Inventors: Wouter Joos Tirry, Leuven (BE);
Ludovic Albert Jozef Van Paepegem, Leuven (BE)

(73) Assignee: NXP B.V., Eindhoven (NL)

( * ) Notice: Subject to any disclaimer, the term of this patent is extended or adjusted under 35 U.S.C. 154(b) by 763 days.

(21) Appl. No.: 10/507,333

(22) PCT Filed: Feb. 17, 2003

(86) PCT No.: PCT/IB03/00616

§ 371 (c)(1),
(2), (4) Date: Sep. 10, 2004

(87) PCT Pub. No.: WO03/077435

PCT Pub. Date: Sep. 18, 2003

(65) Prior Publication Data

US 2005/0105645 A1    May 19, 2005

(30) Foreign Application Priority Data

Mar. 12, 2002 (EP) .................................. 02075981

(51) Int. Cl.
*H04L 27/02* (2006.01)

(52) U.S. Cl. .................. 375/270; 375/277; 375/321; 375/340; 375/350; 455/47; 455/63.1; 455/204; 455/307; 455/337

(58) Field of Classification Search .................. 375/270, 375/277, 285, 320, 321, 340, 350, 268, 316; 455/47, 48, 501, 63.1, 203–205, 296, 307, 455/336, 337; 381/2
See application file for complete search history.

(56) References Cited

U.S. PATENT DOCUMENTS

| 4,709,270 A | * | 11/1987 | Mehrgardt | .................. 348/726 |
| 5,257,312 A | * | 10/1993 | Therssen et al. | ................ 381/4 |
| 5,357,544 A | * | 10/1994 | Horner et al. | ................ 375/340 |
| 5,568,206 A | | 10/1996 | Goeckler | |
| 5,870,402 A | * | 2/1999 | Kelley | ........................ 370/497 |
| 7,295,631 B2 | * | 11/2007 | Wildhagen | .................. 375/316 |

FOREIGN PATENT DOCUMENTS

| EP | 0 512 606 A | 11/1992 |
| EP | 0512606 | 11/1992 |
| EP | 1 259 002 A | 11/2002 |

* cited by examiner

*Primary Examiner*—Dac V Ha (57) ABSTRACT

The invention relates to a receiver (1, 49, 51, 52, 54) for receiving RF signals. The known receiver comprises a phase-locked loop which is controlled by the stereo pilot. Because of unwanted frequency changes, a sampling rate converter precedes the stereo decoder. Filtering operations within a complex range can be performed by means of the invention.

18 Claims, 6 Drawing Sheets

RECEIVER WITH A SIGNAL PATH

The invention relates to a receiver with a signal path comprising the following elements: a tuning arrangement, a demodulator circuit for supplying a stereo multiplex signal with a baseband stereo sum signal (L+R), a 19 kHz stereo pilot and a stereo difference signal (L−R) double-sideband amplitude-modulated on a blanked 38 kHz subcarrier, a sampling arrangement for converting an analog signal into a time-discrete signal, and a stereo decoder with a filter and a phase-locked loop comprising an oscillator.

Such a receiver is known from EP 0512606 B1. In the UHF range of 88-108 MHz, RF signals are transmitted as frequency-modulated signals. Most stations transmit a stereo signal. After demodulation of the RF frequency-modulated signal, a stereo multiplex signal with a baseband stereo sum signal (L+R) in a 15 kHz range and a stereo difference signal (L−R) which is double-sideband amplitude-modulated on a blanked subcarrier of 38 kHz is obtained. The sum signal (L+R) is also referred to as mono signal. A demodulation of the stereo difference signal (L−R) requires a receiver with a large number of circuit components. The receiver includes a phase-locked loop which is controlled by the stereo pilot. When the frequency of the transmitter changes, the stereo pilot also changes. The demodulator in the receiver is readjusted. Because of these unwanted frequency changes, a sampling rate converter, referred to as SRC for short, precedes the stereo decoder. A second sampling rate converter follows the stereo decoder. These converters are elaborate.

It is therefore an object of the invention to provide a simple stereo decoder.

This object is solved by the characteristic features defined in claim 1. According to the invention, filter operations can be performed in a complex range. Frequency response edges are in a complex range around 0 Hz. A multiplication, performed within a period of time, of a real input signal with a cosine wave yields a shift towards two sides within the frequency range, i.e. a modulation around the carrier frequency +/−φ:

$$Y(e^{i\theta}) = (X(e^{i(\theta-\phi)}) + X(e^{i(\theta+\phi)}))/2$$

A modulation by means of a cosine wave having a carrier frequency φ produces an output signal in which the interesting part is supplemented by an unwanted part of the input spectrum around +/−2φ. This can be prevented by means of a prefilter which suppresses the unwanted part in the spectrum around +/−2φ. The same applies to a modulation with a sine wave.

A multiplication of a real or complex signal by means of a complex exponent $e^{i\theta n}$, i.e. with an imaginary exponent, leads to a shift to only one side in the frequency range so that no prefilter is used.

$$Y(e^{i\theta}) = (X(e^{i(\theta-\phi)}))$$

In the stereo decoder, complex modulations are realized by means of the signals cos(nφ) and sin(nφ) supplied by the oscillator. The non-recursive half band filters, i.e. the finite impulse response filters, referred to as FIR filters for short, have the property of a π/2 phase shift. This π/2 phase shift is also referred to as phase quadrature or as quadratic mirroring. The term quadratic mirroring indicates that the transfer function H(f) of this type of filter can be mirrored by a quarter of the sampling frequency (Fs/4) in accordance with the following equation.

$$|H(Fs/4-f)| + |H(Fs/4+f)| = 1$$

The term half band refers to a second property of FIR filters, namely to the fact that these filters serve for a reduction and/or an interpolation. The FIR filters have the interesting property that half of the coefficients is zero. When used for reduction, this means in digital techniques that every second value in a table is removed. For interpolation, this means that a second value, namely the preceding value, is inserted behind each value in the table. A twofold reduction is also referred to as down-sampling by 2.

The third interesting property of the FIR filters is that the delay is an integral multiple of the sampling when the length is chosen to be odd. When these FIR filters are used in connection with complex modulations, only simple delay members are to be inserted so that the complex modulations in the stereo decoder are in phase at different times. The transfer functions of the FIR filters used in the stereo decoder for complex signals are shifted by a quarter of the sampling frequency in the frequency range so that the transition bands, hereinafter also referred to as slopes, are centered around the frequency of 0 Hz, i.e. around $f_0=0$ and overlap with the L+R and L−R spectra which can also be centered around $f_0=0$ when these filters are used. The value $f_0=0$ is also referred to as DC by analogy with direct current, which has the zero frequency at the applied voltage. Because of the mirroring property, the L+R and L−R signal can be retrieved by connecting the real parts of the signals.

The shift of the transfer function of a FIR filter in the frequency range by a quarter of the sampling frequency means that the coefficients of the real FIR filters are modified in the following way:

$$h[n] \rightarrow h[n] e^{in\pi/2}$$

This modification of the coefficients has no further consequences for realizing the FIR filters.

These three properties of the FIR filters in combination with complex modulations are the key to an elegant solution for the stereo decoder.

These and other aspects of the invention are apparent from and will be elucidated with reference to the embodiments described hereinafter.

Figure 1:
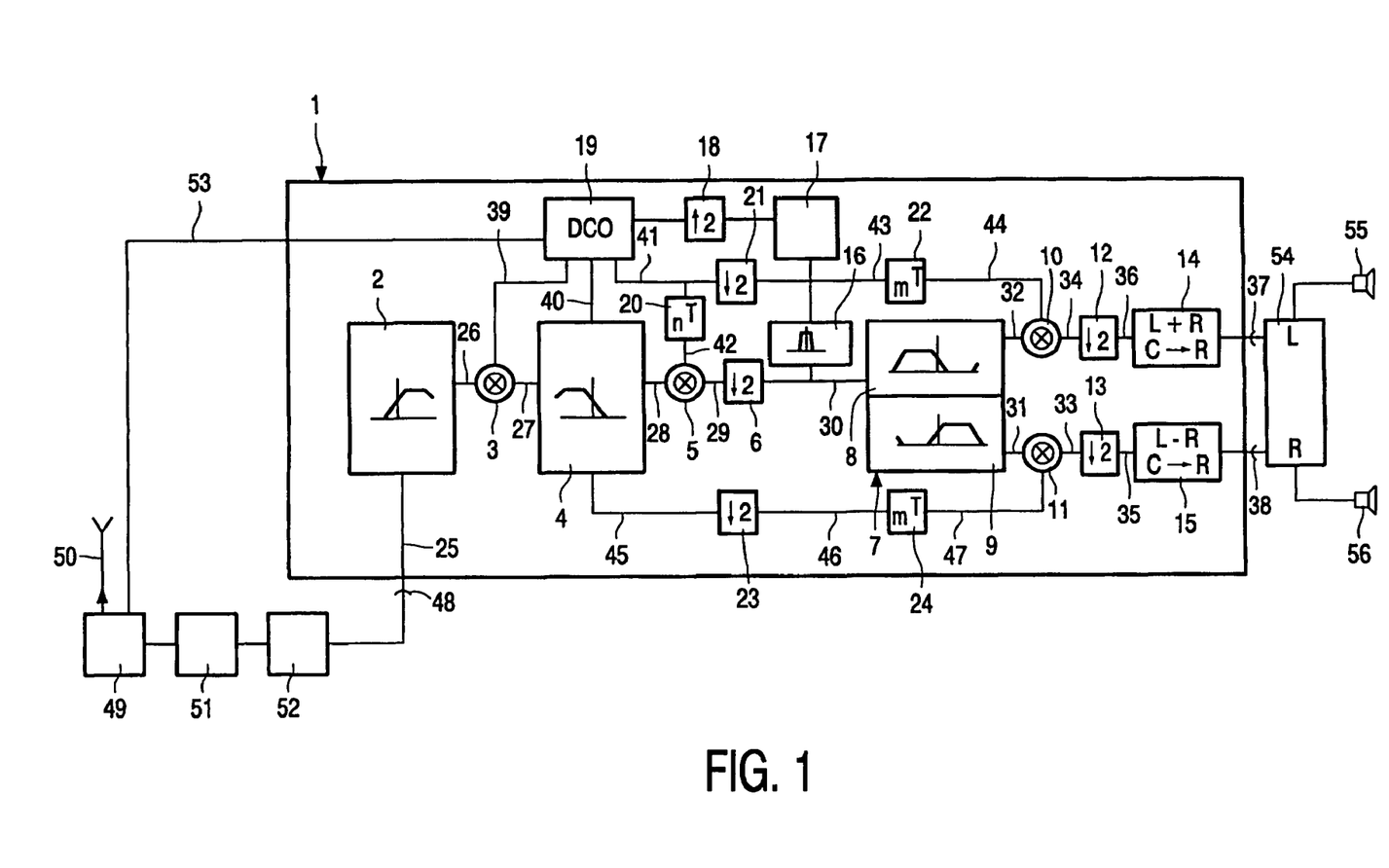
FIG. 1 is a block diagram of a receiver including a stereo decoder.

FIG. 1 shows a stereo decoder 1 with a finite impulse response, or FIR, filter 2, a complex modulator 3, a second FIR filter 4, a second complex modulator 5, a down-sampling-by-2 filter 6, a circuit 7 with two FIR filters 8 and 9, a third and a fourth modulator 10 and 11, two further down-sampling-by-2 filters 12 and 13, two converters 14 and 15, an elliptic low-pass filter 16, a control path 17, a double interpolation filter 18, an oscillator 19, a delay member 20, a fifth down-sampling-by-2 filter 21, a second delay member 22, a sixth down-sampling-by-2 filter 23 and a third delay member 24. Input signals are applied to the FIR filter 2 via an electrically conductive connection 25 in the stereo decoder 1. Two further electrically conductive connections 26 lead from the FIR filter 2 to the modulator 3 and apply signals from the FIR filter 2 to the modulator 3. Signals from the modulator 3 are applied to the second FIR filter 4 via two electrically conductive signal connections 27. Signals are further applied to outputs 37 and 38 via further signal connections 27 to 36 and via the FIR filter 4, the modulator 5, the FIR filters 8 and 9, the modulators 10 and 11, the down-sampling-by-2 filters 12 and 13, and the converters 14 and 15. The connections 26 to 36 are two parallel connections each transmitting a signal.

The oscillator 19 is a discrete controlled oscillator, referred to as DCO for short. The DCO 19 has three outputs with two electrically conductive signal connections 39 to 41 which lead to the complex modulator 3, via the delay member 20 and a further connection 42 to the modulator 5 and via the down-sampling-by-2 filter 21 and the second delay member 22 and further connections 43 and 44 to the modulator 10, via the FIR filter 4, the down-sampling-by-2 filter 23 and the third delay member 24 and further connections 45, 46 and 47 to the modulator 11. The DCO 19 generates a cosine signal on one signal connection of an output and a sine signal on the other signal connection. The signals have a frequency of 38 kHz on the connection 39, a frequency of +19 kHz on the connections 40, 45, 46 and 47, and a frequency of −19 kHz on the connections 41, 42, 43 and 44.

A tuning arrangement 49 with an antenna 50, a frequency modulator 51 and an A/D converter 52 are arranged at an input 48 of the stereo decoder 1. The converter samples the time-division multiplex signal with a sampling rate Fs of 4×44.1 kHz. The tuning arrangement 49 is controlled via a connection 53. Arranged at the outputs 37 and 38 of the stereo decoder 1 is a converter 54 which generates a left and a right stereo signal from the mono signal L+R and the difference signal L−R, which stereo signals are reproduced as acoustic signals by loudspeakers 55 and 56. The stereo decoder 1, the tuning arrangement 49, the frequency modulator 51, the A/D converter 52 and the converter 54 constitute a receiver.

The FIR filters 2, 4, 7, 8 and 9 in combination with complex modulations are the key to an elegant solution for the stereo decoder 1 whose function will now be elucidated with reference to FIGS. 2 to 15.

Figure 2:
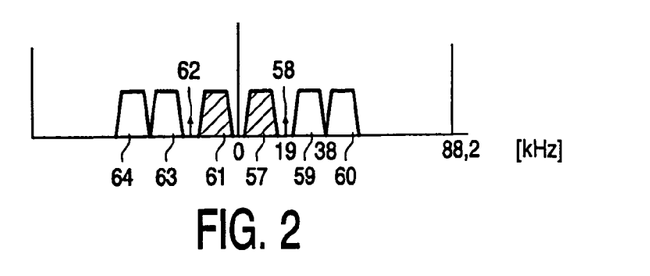
FIG. 2 shows a first frequency spectrum at the input of the stereo decoder.

FIG. 2 shows a spectrum of a multiplex signal applied to the stereo decoder 1, which signal is present on the connection 25 and is sampled at a sampling rate Fs of 4×44.1 kHz. The spectrum is shown without RDS, ARI and SCA signal. Starting from zero, the baseband stereo sum signal L+R with the baseband 57, the pilot 58 at 19 kHz and subsequently the stereo difference signal L−R with the two sidebands 59 and 60 double-sideband amplitude-modulated on a 38 kHz subcarrier extend in the right half of the spectrum. Because of the symmetry property within the frequency range, the bands and the pilot 57-60 are mirrored around zero and occur in a side-inverted form in the left half of the spectrum as bands and pilots 61, 62, 63 and 64.

Figure 3:
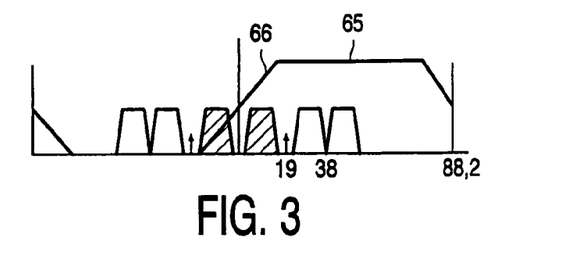
FIG. 3 shows the first spectrum and a frequency response of a first half band, or FIR, filter.

FIG. 3 shows a frequency response 65 of the symmetrical FIR low-pass filter 2 which, viewed from the zero-crossing, is shifted to the right by Fs/4, i.e. by 44.1 kHz. The L+R signal is thus in the transmission band 66, which is hereinafter also referred to as slope. The filter 2 is complex, operates in a complex manner and also supplies a complex output signal.

Figure 4:
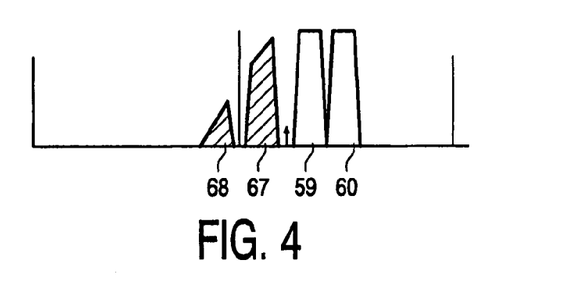
FIG. 4 shows a second spectrum at the output of the first FIR filter.

FIG. 4 shows a spectrum of the complex output signal after filtering of the filter 2. Since the L+R signal is filtered with slope values within the slope 66, reduced values, dependent on the relevant slope value, are obtained for the L+R signal. Sidebands 67 and 68 of the L+R signal are reduced. The complex output signal of the filter 2 is present on the connection 26.

Figure 5:
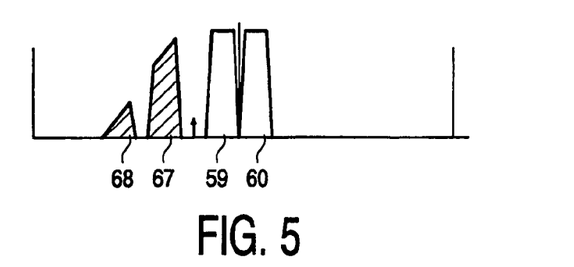
FIG. 5 shows a third spectrum at the output of a first modulator.

FIG. 5 shows a spectrum after the modulation by the modulator 3. The signal is complex-modulated at −38 kHz in the modulator 3, i.e. the spectrum is shifted to the left by −38 kHz. The L−R signal of the spectrum is thus centered around zero, i.e. around DC. The zero is now between the two sidebands 59 and 60 of the L−R signal. The output signal of the modulator 3 is supplied on the connection 27.

Figure 6:
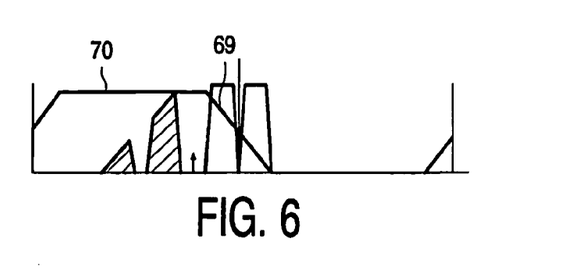
FIG. 6 shows the third spectrum and a frequency response of a second FIR filter.

FIG. 6 shows the centered L−R signal which is now applied to the symmetrical FIR filter 4. The filter is shifted to the left by Fs/4, i.e. by 44.1 kHz. A filtering with the symmetrical FIR high-pass filter, shifted to the right by Fs/4, is also possible. The L−R signal, i.e. the two sidebands of the L−R signal, are thus situated in a second transition band 69, hereinafter also referred to as slope, of a second frequency response 70.

Figure 7:
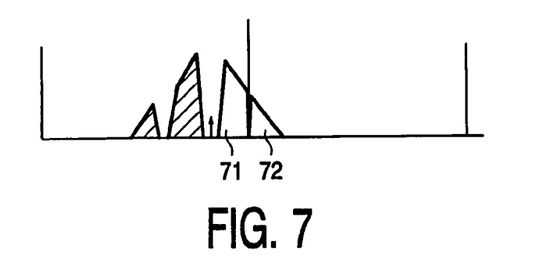
FIG. 7 shows a fourth spectrum at the output of the second FIR filter.

FIG. 7 shows a spectrum after the filtering by means of the filter 4. Since the stereo difference signal L−R is filtered with slope values within the slope 69, reduced values, dependent on the relevant slope value, are obtained for the L−R signal. The associated signal with reduced sidebands 71 and 72 is supplied on the connection 28 and applied to the modulator 5.

Figure 8:
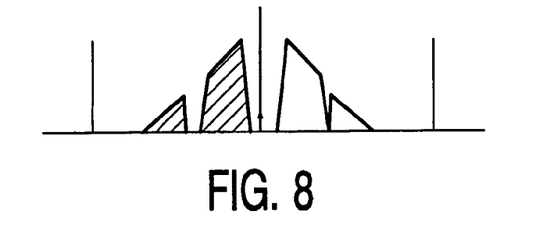
FIG. 8 shows a fifth spectrum at the output of a second modulator.

FIG. 8 shows the spectrum complex-modulated at 19 kHz in the modulator 5 and shifted to the right by 19 kHz. When the frequencies of the complex modulation are exact multiples of the original pilot frequency, the pilot is now situated at the zero-crossing. The signal is down-sampled by 2 in the down-sampling-by-2 filter 6. From the connection 30, the complex signal is passed through two different branches. In one branch, the signal is applied to the filter circuit 7 for the purpose of audio processing and in the other branch it is applied to an elliptic filter 16, i.e. a bandpass filter having a small bandwidth for extraction of the pilots 58 and 62. The pilot 58, which is now near DC, is used for controlling the DCO 19 which controls the complex modulations.

Figure 9:
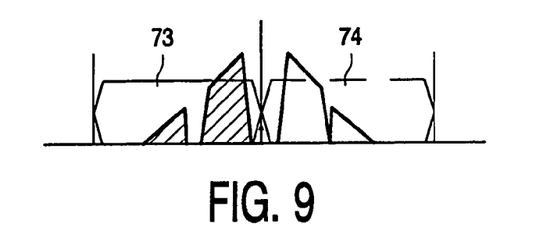
FIG. 9 shows the fifth spectrum and two further frequency responses of a symmetrical FIR high-pass and low-pass filter.

FIG. 9 shows the signal in the filter circuit 7. The FIR filter 8 with a frequency response 73 is shown in the left-hand part and the FIR filter 9 with a frequency response 74 is shown in the right-hand part. The filter circuit is a symmetrical FIR high-pass and low-pass filter which is shifted to the left by (Fs/2)/4=22.05 kHz so that the L+R and the L−R signal are separated.

Figure 10:
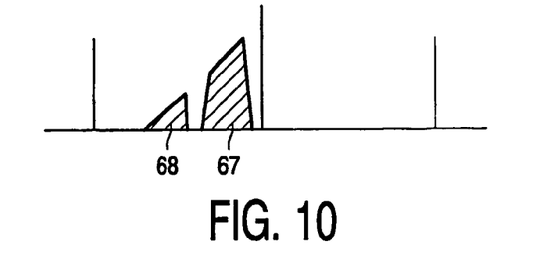
FIG. 10 shows a sixth spectrum at a first output of the symmetrical FIR high-pass and low-pass filter.

FIG. 10 shows a spectrum of an output signal as supplied by the FIR low-pass filter 8 on the connection 32. The signal is the L+R mono signal complex-filtered with the slope 66, with the two reduced sidebands 67 and 68.

Figure 11:
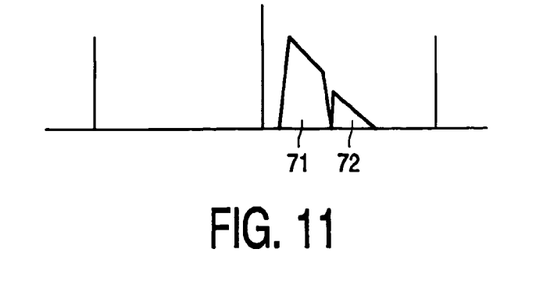
FIG. 11 shows a seventh spectrum at the second output of the symmetrical FIR high-pass and low-pass filter.

FIG. 11 shows a spectrum of an output signal as supplied by the FIR filter 9 on the connection 31. The signal is the L−R stereo difference signal complex-filtered with the slope 69, with the two reduced sidebands 71 and 72.

Figure 12:
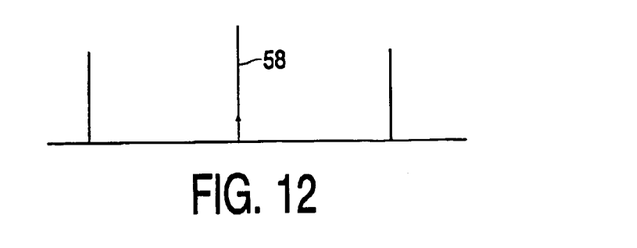
FIG. 12 shows a pilot at an output of an elliptic filter.

FIG. 12 shows a spectrum after the low-pass filter 16. The pilot 58 is at DC.

Figure 13:
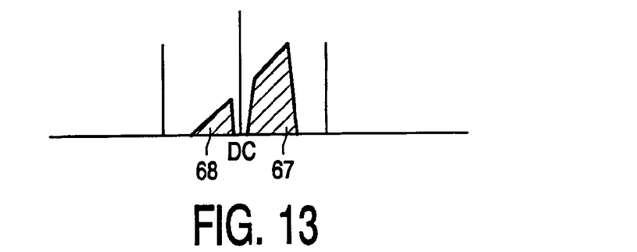
FIG. 13 shows an eighth spectrum with a complex L+R signal at the output of a third modulator.

FIG. 13 shows the spectrum of the L+R mono signal after the modulator 10. In the modulator 10, the signal is modulated with 19 kHz, i.e. shifted to the right by 19 kHz, so that the two reduced sidebands 67 and 68 of the spectrum are DC-centered.

Figure 14:
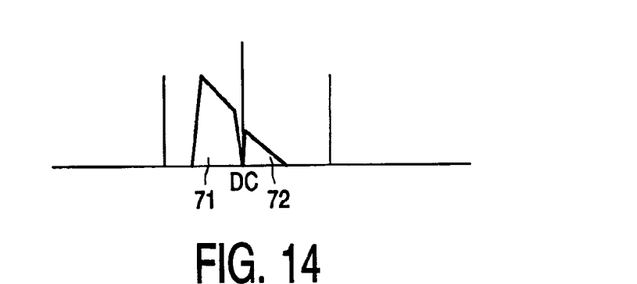
FIG. 14 shows a ninth spectrum with a complex L−R signal at the output of a fourth modulator.

FIG. 14 shows the spectrum of the L−R difference signal after the modulator 11. In the modulator 11, the L−R signal is modulated with −19 kHz, i.e. shifted to the left by −19 kHz so that the two reduced sidebands 71 and 72 of the spectrum are DC-centered.

Figure 15:
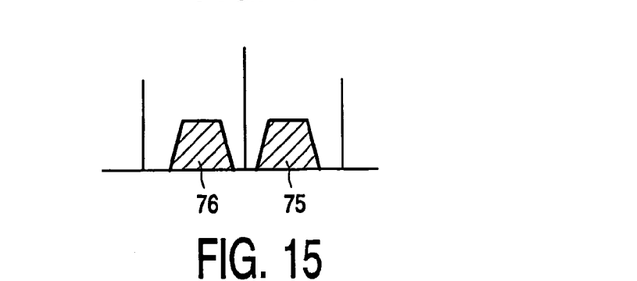
FIG. 15 shows a tenth spectrum of a real L+R signal at the output of a first converter.

FIG. 15 shows a spectrum of the L−R signal with original sidebands 75 and 76 after the converter 14. The converter 14 filters the real parts from the complex L+R signal, thus obtaining the original L+R signal.

Figure 16:
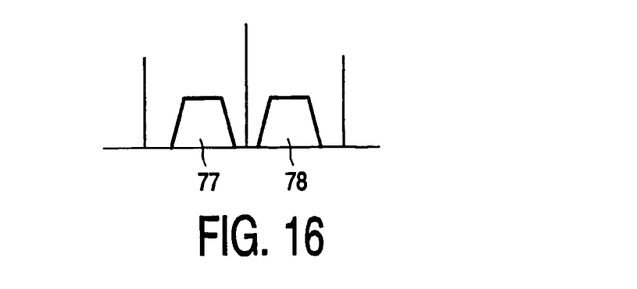
FIG. 16 shows an eleventh spectrum of a real L−R signal at the output of a second converter.

FIG. 16 shows a spectrum of the L−R signal with original sidebands 77 and 78 after the converter 15. The converter 15 filters the real parts from the complex L−R signal, thus obtaining the original L−R signal.

Figure 17:
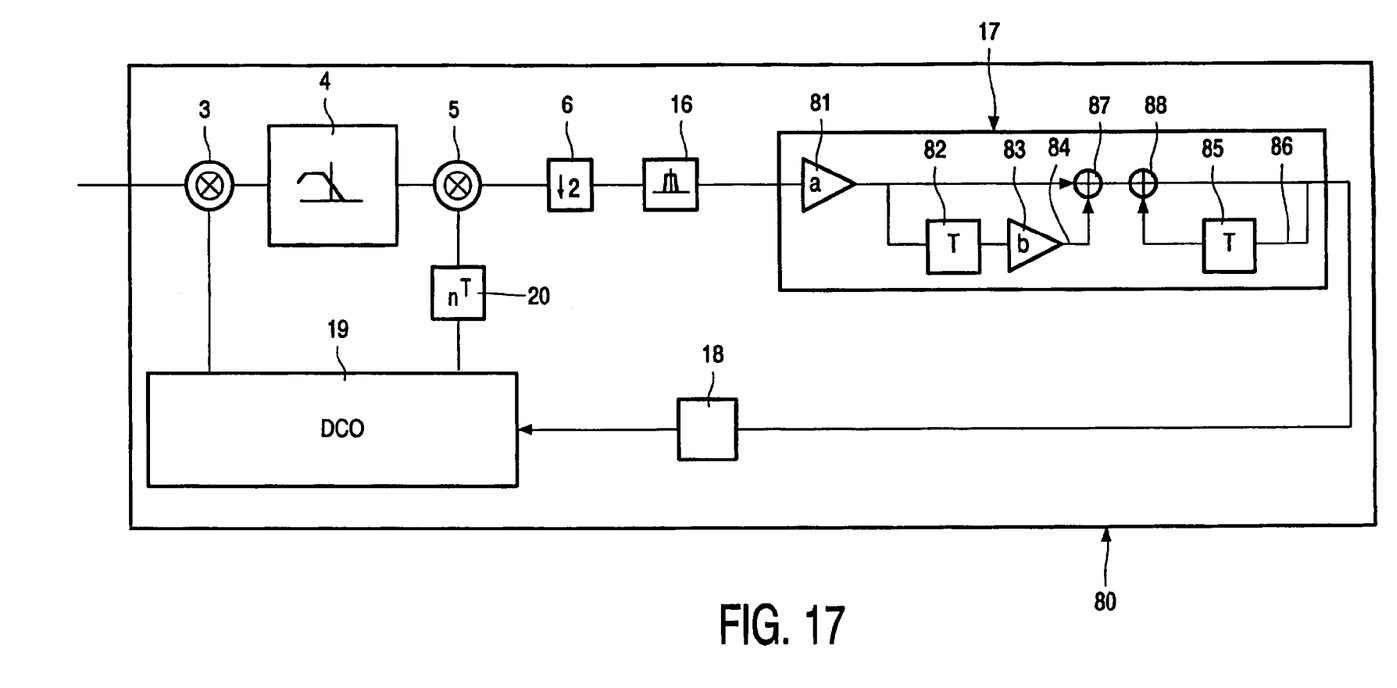
FIG. 17 is a block diagram of a phase-locked loop.

FIG. 17 shows a phase-locked loop, or PLL, 80 with the modulator 3, the FIR filter 4, the second modulator 5, the down-sampling-by-2 filter 6, the elliptic low-pass filter 16, the control path 17, the interpolation filter 18, the DCO 19, and the delay member 20. The control path 17 comprises an amplifier 81 with a coefficient a, a delay member 82 and a second amplifier 83 with a coefficient b in a forward control 84, and a delay member 85 in a feedback control 86, as well as two adders 87 and 88. The PLL 80 operates as follows.

The original L−R signal can only be regained exactly and in phase with the L+R signal when the DCO 19 is clocked with the pilot in frequency and phase synchronism. This means that the complex signal has only a DC part after the elliptic low-pass filter 16, or the imaginary part of the signal is zero. Deviations from zero are used to control the DCO 19 in phase synchronism with the pilot by means of the PLL 80.

When the offset, starting from the initial phase and frequency deviation, is to be set to zero, a proportional and integrating control path 16 is necessary so that the input signal, which is step-shaped both in phase and in frequency, is synchronous with zero in the offset.

Only the imaginary part after the complex modulation, i.e. actually only the phase recognition is utilized in the feedback loop of the PLL and is used for controlling the DCO 19.

The properties of the transient response such as response time and attenuation are adjustable by adjustment of the multiplication coefficients a and b of the amplifiers 81 and 83 in the control path 17.

The input signal of the oscillator 19 is a correction of the mismatching between the phase of the pilot and the output signal of the DCO 19.

Figure 18:
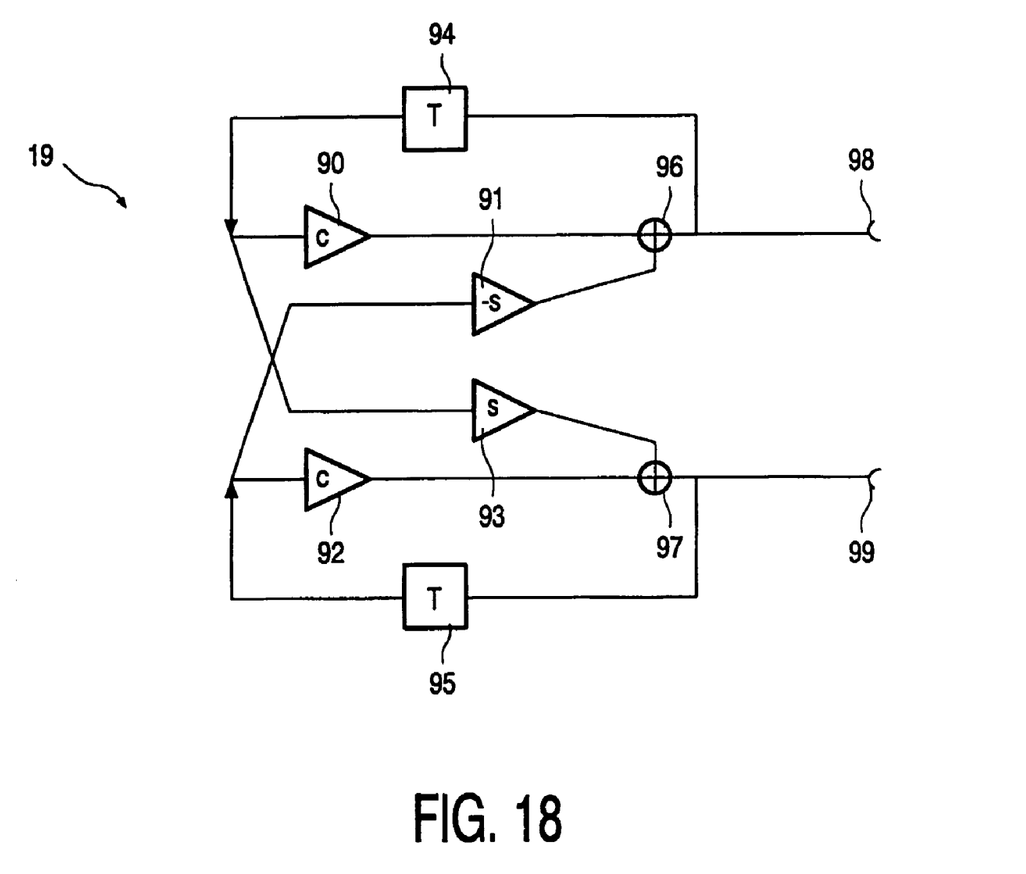
FIG. 18 is a block diagram of an oscillator.

FIG. 18 shows the DCO 19 with four operational amplifiers 90, 91, 92 and 93, two delay members 94 and 95 and two adders 96 and 97. The complex oscillator 19 generates a cosine signal at a first output 98 and a sine signal at a second output 99. Coefficients c of the operational amplifiers 90 and 92, as well as coefficients s and −s of the operational amplifiers 91 and 93 can be calculated as follows:

$$c=\cos(2\pi\theta/Fs)$$

$$s=\sin(2\pi\theta/Fs)$$

The original values in the delay circuits 94 and 95 should be set to 0 and 1. The output signal of the control path, being a correction of the mismatching, is used to adapt the coefficients c and s by linear Taylor sequences, in which $En$ is the output signal of the control path 17, which controls the DCO 19:

$$c=\cos(2\pi\theta/Fs)-\sin(2\pi\theta/Fs)*\Sigma\epsilon n$$

$$s=\sin(2\pi\theta/Fs)+\cos(2\pi\theta/Fs)*\Sigma\epsilon n$$

The complex oscillator 19 with the oscillation frequency Θ may be formed in software as a limit-stable oscillating filter.

List of Reference Numerals:
1 stereo decoder
2 FIR filter
3 complex modulator
4 second FIR filter
5 complex modulator
6 down-sampling-by-2 filter
7 filter circuit
8, 9 FIR filter
10, 11 complex modulator
12, 13 down-sampling-by-2 filter
14, 15 converter
16 low-pass filter
17 control path
18 interpolation filter
19 oscillator
20 delay member
21 down-sampling-by-2 filter
22 second delay member
23 down-sampling-by-2 filter
24 third delay member
25, 26, 27,
28, 29, 30, 31,
32, 33, 34,
35, 36 signal connections
37, 38 output
39, 40, 41 signal connections
42, 43, 44,
45, 46, 47 connections
48 input
49 tuning arrangement
50 antenna
51 frequency demodulator
52 A/D converter
53 connection
54 converter
55, 56 loudspeaker
57 L+R signal
58 pilot
59 L−R signal first sideband
60 L−R signal second sideband
61 L+R signal side-inverted
62 pilot, side-inverted
63 L−R signal first band, side-inverted
64 L−R signal second band, side-inverted
65 frequency response
66 slope
67 L+R sideband, reduced
68 second L+R sideband, reduced
69 second slope
70 second frequency response
71 L−R sideband, reduced
72 second L−R sideband, reduced
73, 74 frequency response
75, 76 real L+R sideband
77, 78 real L−R sideband
79

80 phase-locked loop
81 amplifier
82 delay member
83 amplifier
84 forward control
85 delay member
86 feedback
87, 88 adder
89
90, 91,
92, 93 operational amplifier
94, 95 delay member
96, 97 adder
98, 99 output

The invention claimed is:

1. A receiver (1, 49, 51, 52, 54) with a signal path comprising the following elements: a tuning arrangement (49), a demodulator circuit (51) for supplying a stereo multiplex signal with a baseband stereo sum signal (L+R), a 19 kHz stereo pilot and a stereo difference signal (L−R) double-sideband amplitude-modulated on a blanked 38 kHz subcarrier, a sampling arrangement (52) for converting an analog signal into a time-discrete signal, and a stereo decoder (1) with a filter (2, 4, 7, 8, 9) and a phase-locked loop (80) comprising an oscillator (19), characterized in that filter operations can be performed in a complex range.

2. A receiver as claimed in claim 1, characterized in that the filter (2, 4, 7, 8, 9) is complex.

3. A receiver as claimed in claim 1, characterized in that the complex filter (2, 4, 7, 8, 9) is a finite impulse response filter (2, 4, 7, 8, 9).

4. A receiver as claimed in claim 1, characterized in that the oscillator (19) is discrete-controlled.

5. A receiver as claimed in claim 1, characterized in that the oscillator (19) supplies a complex signal.

6. A receiver as claimed in claim 1, characterized in that the oscillator (19) supplies a cosine signal and a sine signal.

7. A receiver as claimed in claim 1, characterized in that the oscillator (19) comprises a limit-stable oscillating filter.

8. A receiver as claimed in claim 1, characterized in that the oscillator (19) controls a modulator (3, 5, 10, 11).

9. A receiver as claimed in claim 8, characterized in that the modulator (3, 5, 10, 11) comprises a multiplying member.

10. A receiver as claimed in claim 1, characterized in that the sampling arrangement (52) operates at a fixed clock.

11. A receiver as claimed in claim 10, characterized in that the fixed clock is between 4×20 kHz and 4×80 kHz, advantageously between 4×32 kHz and 4×64 kHz, particularly at 4×44.1 kHz.

12. A receiver as claimed in claim 1, characterized in that the stereo pilot is filtered with an elliptic filter (16) having a frequency response around 0 Hz.

13. A receiver as claimed in claim 1, characterized in that the stereo decoder (1) comprises a converter (14, 15) which converts complex signals to real signals.

14. A receiver as claimed in claim 1, characterized in that the phase-locked loop (80) comprises a control path (17) with an amplifier (81, 83).

15. A method of decoding a time-discrete stereo multiplex signal with a baseband stereo sum signal (L+R), a 19 kHz stereo pilot and a stereo difference signal (L−R) double-sideband amplitude-modulated on a blanked 38 kHz subcarrier in a decoder of a receiver, characterized by the steps of
filtering the stereo multiplex signal by means of a filter, in which one of the two stereo signals (L+R, L−R) is complex-filtered by means of a slope,
complex-modulating the filtered signal by means of a modulator,
filtering the modulated signal by means of a filter, in which the other one of the two stereo signals (L+R, L−R) is complex-filtered by means of a slope,
complex-modulating the signals,
separating the baseband stereo sum signal (L+R) and the stereo difference signal (L−R),
modulating the L−R and the L+R signal, and
converting the signals from complex signals to real signals.

16. A method as claimed in claim 15, characterized in that the modulated signal is down-sampled by 2 after the second modulation.

17. A method as claimed in claim 15, characterized in that the signal is down-sampled by 2 after the third modulation.

18. A method as claimed in claim 15, characterized in that the real signals are separated into a left and a right stereo signal.

* * * * *